US007827260B2

(12) United States Patent
Huston et al.

(10) Patent No.: US 7,827,260 B2
(45) Date of Patent: Nov. 2, 2010

(54) APPARATUS, SYSTEM, AND METHOD FOR CONFIGURING ZONE CONTROL OF A NETWORK FEATURE IN A HETEROGENEOUS NETWORK

(75) Inventors: Lisa Anne Huston, S.W. Rochester, MN (US); David Lynn Merbach, N.E. Rochester, MN (US); Daryl Edward Mowrer, NW Rochester, MN (US); Sunil Bharadwaj, Portland, OR (US); Kevin Joseph Webster, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 1422 days.

(21) Appl. No.: 10/962,969

(22) Filed: Oct. 12, 2004

(65) Prior Publication Data

US 2006/0080318 A1     Apr. 13, 2006

(51) Int. Cl.
    G06F 15/173    (2006.01)
(52) U.S. Cl. .................. 709/223; 709/224; 709/225; 709/226
(58) Field of Classification Search .......... 709/223
    See application file for complete search history.

(56) References Cited

U.S. PATENT DOCUMENTS 6,681,232 B1 *   1/2004   Sistanizadeh et al. .... 707/104.1

| 7,401,338 B1 * | 7/2008 | Bowen et al. ............... 719/328 |
| 2002/0105972 A1 * | 8/2002 | Richter et al. ............... 370/474 |
| 2002/0143942 A1 | 10/2002 | Li et al. ...................... 709/225 |
| 2003/0146929 A1 | 8/2003 | Baldwin et al. ............. 345/733 |
| 2003/0149752 A1 * | 8/2003 | Baldwin et al. ............. 709/223 |
| 2003/0149763 A1 | 8/2003 | Heitman et al. ............. 709/224 |
| 2005/0226260 A1 * | 10/2005 | Berman ...................... 370/401 |

FOREIGN PATENT DOCUMENTS

WO     WO0055750 A1     9/2000
WO     WO02071224 A1    9/2002

OTHER PUBLICATIONS

Veritas Software Corp. "The Architecture of Veritas SANPoint Control", May 2000 Veritas Software Corp. pp. 1-4.

* cited by examiner

*Primary Examiner*—Jeffrey Pwu
*Assistant Examiner*—Abdelnabi O Musa
(74) *Attorney, Agent, or Firm*—Kunzler Needham Massey & Thorpe

(57) ABSTRACT

An apparatus, system, and method are provided for configuring a network feature for a network fabric. The apparatus includes an input module, a discovery module, a selection module and an assignment module. The input module receives a network feature configuration for a network fabric. The discovery module determines the network feature capabilities of each of a plurality of agents coupled to the network fabric. The selection module selects a preferred agent from the plurality of agents. The assignment module assigns the preferred agent to apply the network feature configuration to the network fabric through a management interface coupling the preferred agent to the network fabric.

27 Claims, 8 Drawing Sheets

APPARATUS, SYSTEM, AND METHOD FOR CONFIGURING ZONE CONTROL OF A NETWORK FEATURE IN A HETEROGENEOUS NETWORK

BACKGROUND OF THE INVENTION

1. Field of the Invention

The invention relates to networks. Specifically, the invention relates to apparatus, systems, and methods for configuring a network feature for a network fabric.

2. Description of the Related Art

The ability to connect various devices in a network such that the devices can share information is widely relied on. The Internet, for example, is a collection of computer devices connected to each other such that users throughout the world can share information with each other. The design and configuration of such networks is a specialized task that may require specific education and expertise. Automating the process of configuring a network is desirable since automation reduces the time and expense of configuring and maintaining a network.

FIG. 1 illustrates a conventional network 100. The network comprises host data processors 102, herein referred to as hosts 102, devices 104, a network fabric 106, physical couplings 108, and data interfaces 112. Hosts 102 typically provide a service or application to one or more devices 104. For example, services and applications include an Internet web server, a network fileserver, a security server, and the like.

Devices 104 typically access services provided by hosts 102. A personal computer executing a web browser is an example of a device 104 that accesses services provided by a web server serving as a host 102. Devices 104 may also provide resources to a host 102. For example, tape drives, RAID arrays, and hard drives are devices 104 that provides storage resources to a host 102.

The network fabric 106 comprises one or more switches 110 coupled to each other by a physical coupling 108. The physical coupling 108 comprises a wireless link, copper cable, or fiber optic cable. Switches 110 are coupled to hosts 102 and devices 104 by data interfaces 112. The term switch 110 is used generically herein to refer to a switch, router, bridge, hub, or other network interconnect device. The network fabric 106 includes data interfaces 112, logical communication paths that use various protocols to communicate over the physical coupling 108, that couple the network fabric 106 to either a host 102 or a device 104. Example protocols that can be used by the data interface 112 include Fibre Channel, Ethernet, Internet Protocol (IP), and the like.

The network fabric 106 enables a host 102 to communicate with any other host 102 or any device 104 connected to the network fabric 106. Similarly, the network fabric 106 enables a device 104 to communicate with any other device 104 or host 102 connected to the network fabric 106. This many to many connectivity enables sharing of information among the hosts 102 and devices 104 of the network 100.

The number and arrangement of physical couplings 108 connecting switches 110 to each other may comprise various topologies. The network fabric 106 can comprise switches 110 manufactured by one vendor, resulting in a homogenous network fabric 106. Alternatively, the network fabric 106 can comprise switches 110 from two or more vendors, resulting in a heterogeneous network fabric 106.

The switches 110 enable the network fabric 106 to provide one or more network features. For example, certain switches 110 allow the bandwidth of the network fabric's data interfaces 112 to be adjusted. This bandwidth adjustment feature enables an operator to configure some data interfaces 112 to operate with higher bandwidth than other data interfaces 112 in an effort to minimize congestion within the network fabric 106. An additional feature may restrict communication between certain hosts 102 and certain devices 104. For example, the switches 110 may prevent a particular host 102 from communicating with all but one device 104 to provide some level of security.

A network administrator typically configures the switches 110 to provide the features described above or other features well known to those of skill in the art. A network feature configuration 118 stores the configuration of one or more switch features on the switch 110. The network feature configuration 118 can comprise a file or data stored in memory of the switch 110.

The network administrator generally configures a switch 110 using a management agent 114 (herein referred to as an agent 114). An out-of-band management interface 116 couples the agent 114 to a switch 110. The agent 114 provides the network administrator with a set of commands or a graphical user interface (GUI) for configuring a switch 110. There may be one agent 114 associated with each management interface 116.

The management interface 116 conveys configuration information to the switch 110. The switch 110 stores the configuration information in a network feature configuration 118. The data interface 112 transfers data between a host 102 or device 104 and a switch 110. Typically, the agent 114 does not use the management interface 116 to transfer data between the agent 114 and the switch 110. Conventional data interfaces 112 do not convey configuration information to the switch 110.

Out-of-band management interfaces 116 connect an agent 114 to a switch 110 over a physical coupling 108. The agent 114 and switch 110 use the physical coupling 108 as an out-of-band management interface 116 (illustrated in FIGS. 1-2 as lightning bolts) rather than using the physical coupling 108 as a data interface 112. Out-of-band management interfaces 116 typically use the IP protocol for communication between the switch 110 and the agent 114.

The management interface 116 uses a particular syntax and available parameter set for configuration. Some standards, such as Fibre Channel GS-3 and Simple Network Management Protocol (SNMP) Management Information Bases (MIBs), provide a consistent management interface 116 among switches 110 in heterogeneous network fabrics 106. However, typically each switch vendor implements an Application Programmer Interface (API) comprising a different syntax and different available parameter set. Heterogeneous networks are challenging to configure since the management interface 116 for each switch vendor's switches 110 in the network fabric 106 may be substantially different. An agent 114 configures each switch 110 by presenting commands in a format that the switch 110 understands.

In some network fabrics 106, such as Fibre Channel Storage Area Networks (SANs), once the management interface 116 configures a single switch 110 in the network fabric 106, the switch 110 communicates the network feature configuration 118 to the other switches 110 that comprise the network fabric 106 using standards-based methods. In this manner, a network administrator can configure the entire network fabric 106 by configuring a single switch 110.

Configuring a network fabric 106 is challenging since a network administrator needs to know which management interfaces 116 and agents 114 are available and which of those management interfaces 116 are active. The network administrator must then select an agent 114 to configure the network fabric 106 and remember the syntax and parameter set for the switch 110 coupled to the agent 114. This method of configuring a network fabric 106 is error prone because the method places so many demands on the network administrator. An automated method is desirable that saves the network administrator time and produces a consistent, error free configuration of the network fabric 106.

A Storage Area Network (SAN) is a particular example of the conventional network 100 illustrated in FIG. 1. A SAN 100 comprises hosts 102 that communicate with storage devices 104 through a SAN fabric 106. The storage devices are one example of a device 104 (described above). A storage device 104 may be a disk drive, tape drive, disk array, or other storage device. The SAN fabric 106 is one example of a network fabric 106 as described above. Hosts 102 access storage devices 104 through the SAN fabric 106.

Zone control is a common network feature for a SAN fabric 106. Zone control defines logical zones that restrict communication between hosts 102 and storage devices 104. For example, in FIG. 1, two zones 120,122 segment the hosts 102 and the devices 104. A first zone 120 comprises the leftmost host 104, the SAN fabric 106, and the leftmost storage device 104. A second zone 122 comprises the middle and right hosts 102, the SAN fabric 106, and the middle and right storage devices 104. Since the leftmost host 102 is in the first zone 120, zone control prevents the leftmost host 102 from communicating with the other hosts 102 or with the middle or rightmost storage devices 104. A physical path exists, but zone control presents a logical barrier to the communication A network administrator implements separate zones 120, 122 by configuring the switches 110 of the SAN fabric 106 with a membership list for each zone 120,122. The membership list specifies which hosts 102 and storage devices 104 are members of each zone. The switches 110 allow communication between hosts 102 and storage devices 104 in the same zone 120,122 and prevent communication between hosts 102 and storage devices 104 of different same zones 120,122. Hosts 102 and storage devices 104 may be members of more than one zone 120,122.

In addition to configuring zone membership, the network administrator can configure a switch 110 with other zone control features. These features may include active and inactive zones, hard or soft zone control, and the use of aliases when identifying zone membership. The availability of these features varies among switch vendors. The network administrator typically considers the availability of these features when selecting an agent 114 to configure the SAN fabric 106. To optimally select an agent 114, the network administrator is expected to have detailed knowledge of the availability and supported feature set of each agent 114 coupled to the SAN fabric 106. Requiring the network administrator to acquire and properly use this detailed knowledge is error prone and time consuming.

From the foregoing discussion, it should be apparent that a need exists for an apparatus, system, and method that configures a network feature for a network fabric 106 by receiving a network feature configuration 118 from a network administrator, determining the network feature capabilities of each agent 114, selecting a preferred agent, and applying the network feature configuration 118 using the preferred agent. Beneficially, such an apparatus, system, and method would reduce the number of errors in network feature configurations 118 and drastically reduce the amount of time spent configuring a network fabric 106.

SUMMARY OF THE INVENTION

The various embodiments of the present invention have been developed in response to the present state of the art, and in particular, in response to the problems and needs in the art that have not yet been met for configuring a network feature for a network fabric. Accordingly, the various embodiments have been developed to provide an apparatus, system, and method for configuring a network feature for a network fabric that overcomes many or all of the above-discussed shortcomings in the art.

An apparatus according to one embodiment of the present invention includes an input module, a discovery module, a selection module, and an assignment module. The input module receives a network feature configuration for a network fabric from a user or from another apparatus. The discovery module determines the network feature capabilities of each of a plurality of agents coupled to the network fabric. The selection module selects a preferred agent from the plurality of agents to configure the network fabric.

The assignment module assigns the preferred agent to apply the network feature configuration to the network fabric through a management interface. The management interface couples the preferred agent to the network fabric. In certain embodiments, a lock module prevents one or more agents from applying another network feature configuration to the network fabric as the preferred agent is applying the network feature configuration to the network fabric.

In certain embodiments, at least one of the agents resides on a host processor that is coupled to the SAN fabric. In yet other embodiments, at least one of the agents resides on a stand-alone server coupled to the network fabric by an out-of-band management interface.

In certain embodiments, the preferred agent includes a verification module that regularly verifies that the apparatus is coupled to the network fabric. Preferably, the preferred agent includes a translation module that transforms the desired network feature configuration into a format suitable for the management interface. In certain embodiments, the preferred agent includes a confirmation module that validates the network fabric configuration after the preferred agent applies the network feature configuration to the network fabric.

A system according to one embodiment of the present invention includes a SAN fabric, a plurality of host data processors, a plurality of storage devices, a plurality of agents, a feature configuration manager, and a preferred agent. The feature configuration manager receives a zone control configuration for the SAN fabric from a user or from another apparatus. The feature configuration manager determines the zone control capabilities of each of the agents and selects a preferred agent to configure the SAN fabric. The feature configuration manager assigns the preferred agent to configure the SAN fabric. The preferred agent receives the zone control configuration from the feature configuration manager and applies the zone control configuration to the SAN fabric.

The present invention also includes embodiments arranged as a method and machine-readable instructions that comprise substantially the same functionality as the components and steps described above in relation to the apparatus. Embodiments of the present invention provide a generic network feature configuration solution that uses a preferred agent to apply a network configuration to a network fabric. The features and advantages of different embodiments will become more fully apparent from the following description and appended claims, or may be learned by the practice of embodiments of the invention as set forth hereinafter.

BRIEF DESCRIPTION OF THE DRAWINGS

In order that the advantages of the different embodiments of the invention will be readily understood, a more particular description of the embodiments briefly described above will be rendered by reference to specific embodiments that are illustrated in the appended drawings. Understanding that these drawings depict only typical embodiments of the invention and are not therefore to be considered to be limiting of its scope, the embodiments will be described and explained with additional specificity and detail through the use of the accompanying drawings, in which.

DETAILED DESCRIPTION OF THE INVENTION

Figure 1:
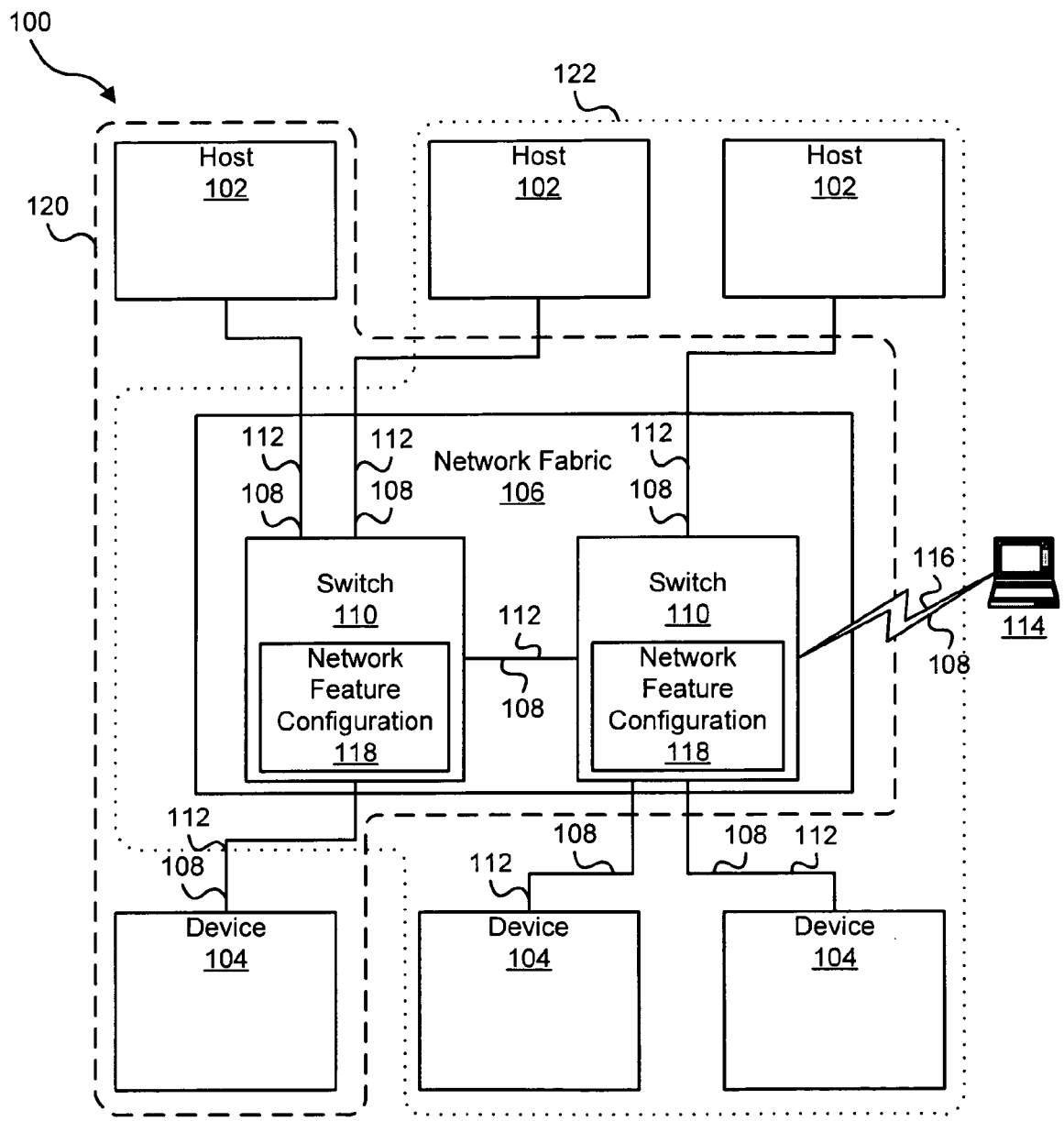
FIG. 1 is a schematic block diagram illustrating a conventional network.

It will be readily understood that the components of embodiments of the present invention, as generally described and illustrated in the Figures herein, may be arranged and designed in a wide variety of different configurations. Thus, the following more detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, function, or other construct. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several tangible memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, user interfaces, network transactions, database queries, database structures, hardware modules, hardware circuits, hardware chips, etc., to provide a thorough understanding of embodiments of the invention. One skilled in the relevant art will recognize, however, that the embodiments of the invention can be practiced without one or more of the specific details, or with other methods, components, materials, etc. In other instances, well-known structures, materials, or operations are not shown or described in detail to avoid obscuring aspects of the various embodiments.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 2:
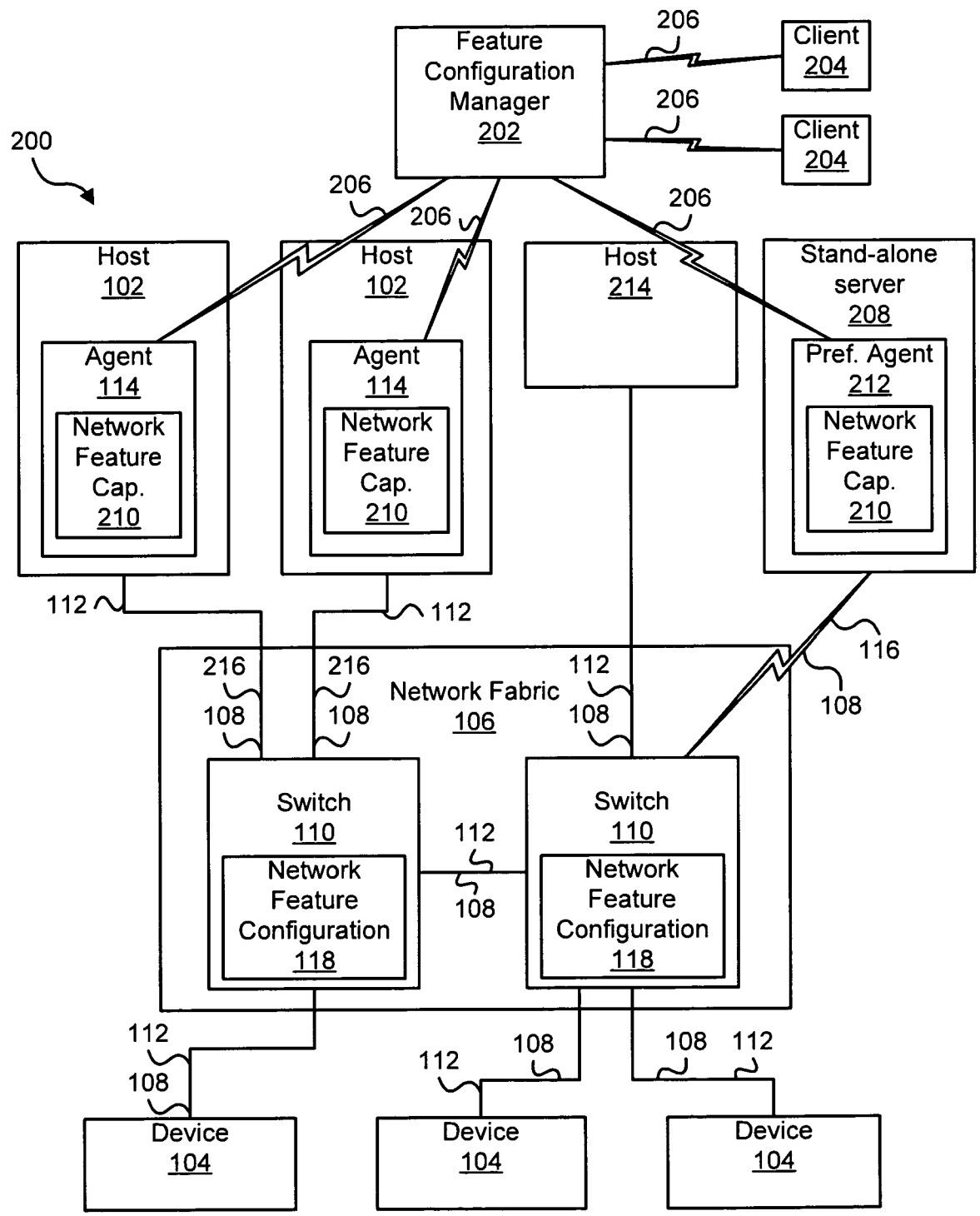
FIG. 2 is a schematic block diagram illustrating one embodiment of an system for configuring a network feature for a network fabric.

FIG. 2 illustrates a system 200 for configuring a network feature for a network fabric 106. The system 200 in the depicted embodiment includes hosts 102, devices 104, a network fabric 106, switches 110, data interfaces 112, out-of-band management interfaces 116, and network feature configurations 118 substantially the same as described above in relation to FIG. 1. The system 200 in the depicted embodiment may also include a feature configuration manager 202, clients 204, application interfaces 206, a stand-alone server 208, and in-band management interfaces 126. In addition, each agent 114 includes network feature capabilities 210.

The feature configuration manager 202 implements a desired network feature configuration 118 using a preferred agent 212. The feature configuration manager 202 may receive a desired network feature configuration 118 from one or more clients 204 via an application interface 206. A network administrator provides a desired network feature configuration 118 to the client 204 via text commands, a graphical user interface, or other input device. The feature configuration manager 202 communicates with each agent 114 using an application interface 206. The application interface 206 is a logical communication path that uses one or more protocols to communicate with the feature configuration manager 202.

The feature configuration manager 202 determines the network feature capabilities 210 of each agent 114 coupled to the network fabric 106. The feature configuration manager 202 selects a preferred agent 212 from the plurality of agents 114 and assigns the preferred agent 212 to configure the network fabric 106. Preferably, the feature configuration manager 202 prevents an agent 114 other than the preferred agent 212 from applying any network feature configuration to the network fabric 106 until the preferred agent 212 has configured the network fabric 106.

The preferred agent 212 receives the network feature configuration 118, and, if necessary, translates the network feature configuration 118 into a format suitable for the management interface 116,216 that couples the preferred agent 212 to a switch 110. The preferred agent 212 regularly verifies that the management interface 116,216 remains coupled to the switch 110. The preferred agent 212 applies the translated network feature configuration 118 to a switch 110 in the network fabric 106. Preferably, the preferred agent 212 validates that the switch 110 properly received and applied the network feature configuration 118. The switch 110 typically forwards the network feature configuration 118 to the other switches 110 in the network fabric 106 using well-known standard methods.

FIG. 2 illustrates two agents 114 located on hosts 102. The agents 114 execute on the hosts 102 in addition to other applications that are installed on the hosts 102. Preferably the agents 114 are non-intrusive; the agents 114 have little impact on other applications installed on the hosts 102. Typically, in-band management interfaces 216 couple agents 114 installed on hosts 102 to a switch 110.

In-band management interfaces 216 (illustrated in FIGS. 1-2 as lines) typically share a physical coupling 108 with a data interface 112. In-band management interfaces 216 typically use the same protocol as the data interface 112 with which the in-band management interface 216 shares the physical coupling 108. Consequently, the agent 114 uses some of the capacity of the physical coupling 108, typically used for the data interface 112, for the in-band management interface 216. Sharing the capacity of the physical coupling 108 may be un-desirable since the data interface 112 may inhibit communications on the in-band management interface 126 by consuming the capacity of the physical coupling 108.

For example, in network fabrics 106 that use Fibre Channel data interfaces 112, the in-band management interface 216 conveys configuration commands using a Fibre Channel protocol. Similarly, network fabrics 106 that use IP data interfaces 112 typically use IP in-band management interfaces 216.

Typically switches 110 include both an in-band management interface 216 and an out-of-band management interface 116. However, not all switches 110 utilize the out-of-band management interface 116 since it may not be practical to incur the expense of coupling each out-of-band management interface 116 to an agent 114, especially if the switches 110 of the network fabric 106 are located in multiple disparate locations.

Out-of band management interfaces 116 may also couple agents 114 installed on hosts 102 to a switch 110. Certain hosts 214 may not include an agent 114. For example, host 214 does not include an installed agent 114.

The system 200 includes a stand-alone server 208. The stand-alone server 208 may not serve as a host 102. Instead, the stand-alone server 208 may provide for an installed agent 114. In this embodiment, the feature configuration manager 202 selects the agent 114 installed on the stand-alone server 208 as the preferred agent 212. The methodology for selecting the preferred agent 212 is described below in relation to FIGS. 5-7. The feature configuration manager 202 could have selected any of the agents 114 as the preferred agent 212. An agent 114 selected as the preferred agent 212 may vary over time. Each time the feature configuration manager 202 applies a feature configuration 118 to the network fabric 106 a different preferred agent 212 may be chosen. Typically, out-of-band management interfaces 116 couple agents 114 installed on a stand-along server 208 to a switch 110. Typically, a data interface 112 does not couple the stand-alone server 208 the network fabric 106.

The system 200 is capable of configuring substantially any network feature for substantially any network fabric 106. For example, the system 200 may configure a zone control feature or a bandwidth assignment feature for a network fabric 106. Similarly, the system 200 may configure a Storage Area Network (SAN) fabric 106 or an Internet Protocol (IP) fabric 106. The devices 104 of the system 200 may comprise substantially any device 104 including a storage device 104 or a personal computer executing a web browser.

Figure 3:
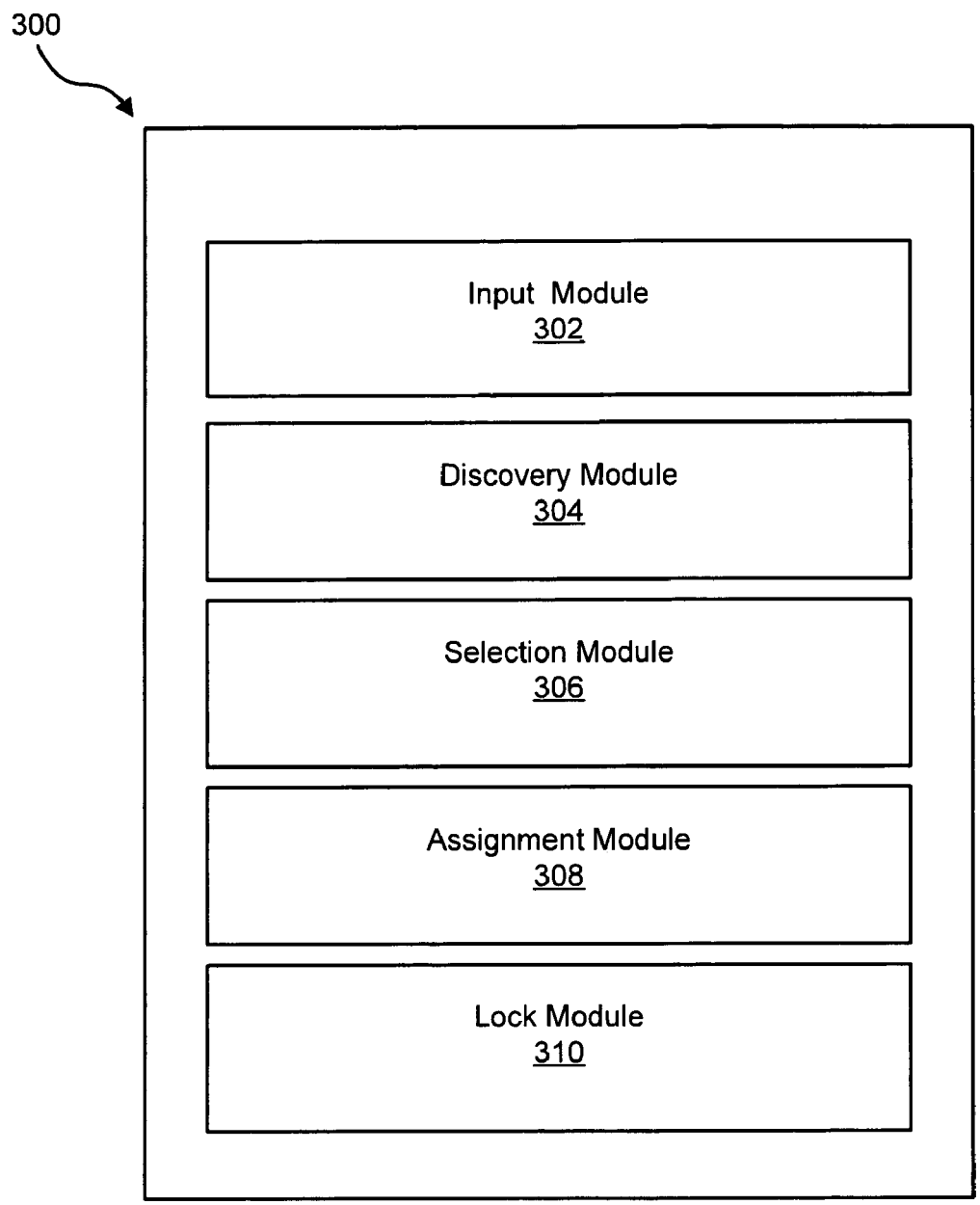
FIG. 3 is a schematic block diagram illustrating one embodiment of an apparatus for configuring a network feature for a network fabric.

FIG. 3 illustrates an apparatus 300 for configuring a network feature for a network fabric 106. The apparatus 300 comprises an input module 302, a discovery module 304, a selection module 306, an assignment module 308, and optionally a lock module 310. The input module 302 receives a network feature configuration 118 for a network fabric 106. The discovery module 304 determines the network feature capabilities 210 of each of the agents 114 coupled to the network fabric 106. The selection module 306 selects a preferred agent 212 from the plurality of agents 114.

The assignment module 308 assigns the preferred agent 212 with the task of applying the network feature configuration 118 to the network fabric 106 through a management interface 116,216 coupling the preferred agent 212 to a switch 110 in the network fabric 106. The lock module 310 prevents an agent 114, other than the preferred agent 212, from applying another network feature configuration 118 to the network fabric 106 while the preferred agent 212 is applying the network feature configuration 118 to the network fabric 106. The switch 110 preferably forwards the network feature configuration 118 to the other switches 110 in the network fabric 106 using standard methods.

The apparatus 300 is configured to implement substantially any network feature for substantially any network fabric using a preferred agent 212. Representative examples of the apparatus 300 may configure a zone control feature, a security feature, or a virtual SAN feature of a SAN fabric 106.

Figure 4:
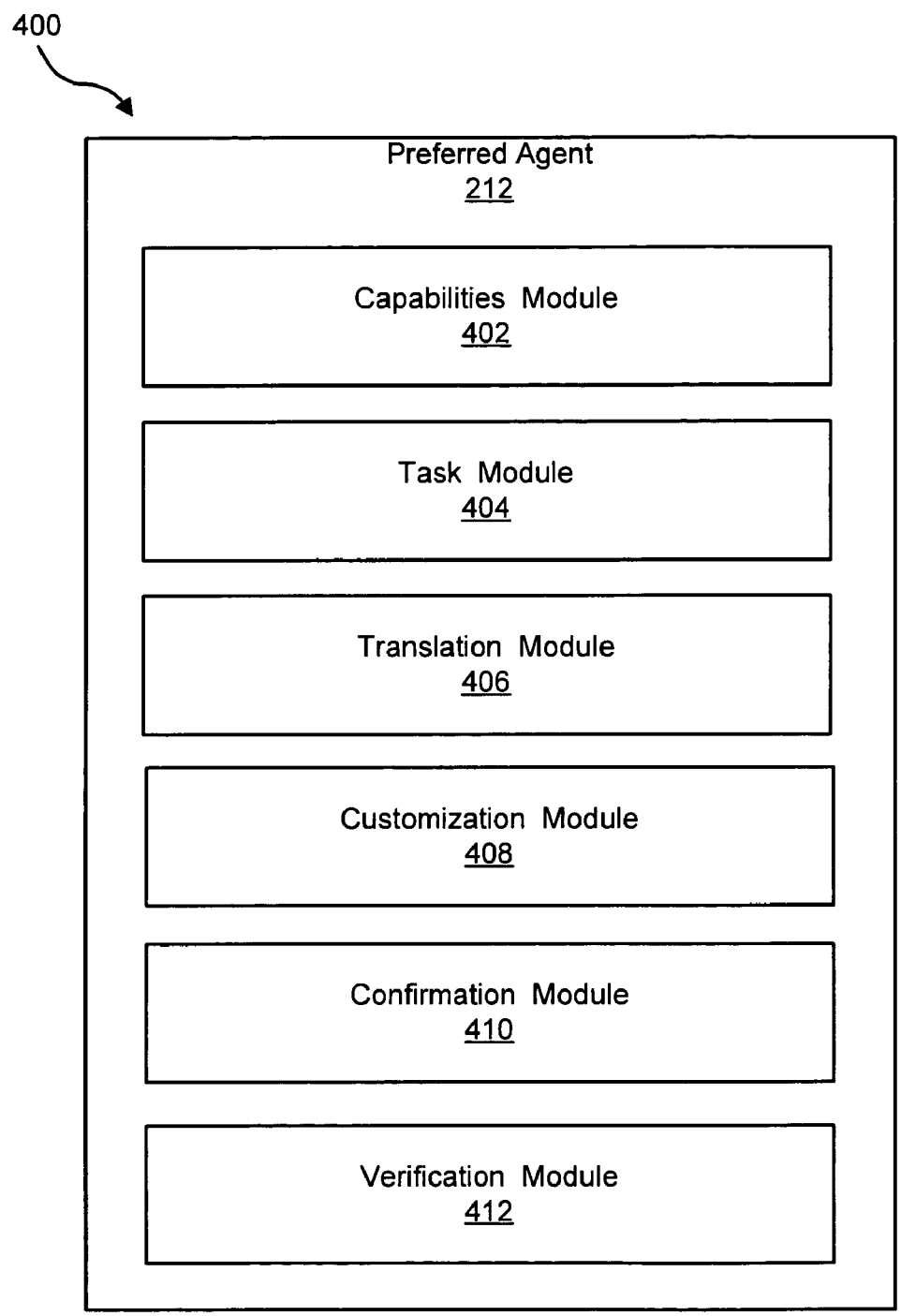
FIG. 4 is a schematic block diagram illustrating one embodiment of an apparatus for configuring a network feature for a network fabric.

FIG. 4 illustrates an apparatus 400 for configuring a zone control feature for a SAN fabric 106. Zone control is desirable since zone control enables a network administrator to implement a degree of security. For example, the network administrator of a corporation may place all hosts 102 that act as corporate web servers and the storage devices 104 storing information used by the web servers in one zone 120,122 and the hosts 102 and storage devices 104 used by the corporation's finance department for accounting in a second zone 120,122. Zoning the hosts 102 and storage devices 104 in this manner may prevent a malicious hacker from manipulating a web server host 102 in some manner to get access to a finance storage device 104.

A network administrator may also use zone control to segment operating systems from each other. For example, the network administrator may place all hosts 102 executing a Windows operating system into one zone 120,122, and all hosts 102 executing a UNIX operating system in a second zone 120,122. Segmenting the hosts 102 in this manner prevents accidental overlap by the operating systems and reduces the number of devices that each operating systems needs to discover and communicate with. The network administrator may also use zone control to segment a production SAN from a test SAN. This enables a network administrator to test new hardware or software using the test SAN without risk of impacting the production SAN.

The apparatus 400 comprises a capabilities module 402, a task module 404, a translation module 406, a customization module 408, a confirmation module 410, and a verification module 412. The capabilities module 402 provides the apparatus' zone control capabilities 210 to a feature configuration manager 202. Zone control capabilities 210 are one representative example of network feature capabilities 210 discussed above.

The task module 404 receives a zone control configuration 118 from a feature configuration manager 202. The zone control configuration 118 is one representative example of the network feature configuration 118 discussed above. The translation module 406 transforms the zone control configuration 118 into a format suitable for the switch 110 that the preferred agent 212 is coupled to.

The customization module 408 applies the zone control configuration 118 to a switch 110 through a management interface 116,216 coupling the apparatus 400 to the SAN fabric 106. The confirmation module 410 validates the SAN fabric configuration after the apparatus 400 applies the zone control configuration 118 to a switch 110. The verification module 412 regularly verifies that the apparatus 400 remains operably coupled to the SAN fabric 106. The switch 110 preferably forwards the network feature configuration 118 to the other switches 110 in the network fabric 106 using standard methods outside the scope of this embodiment of the invention.

Figure 5:
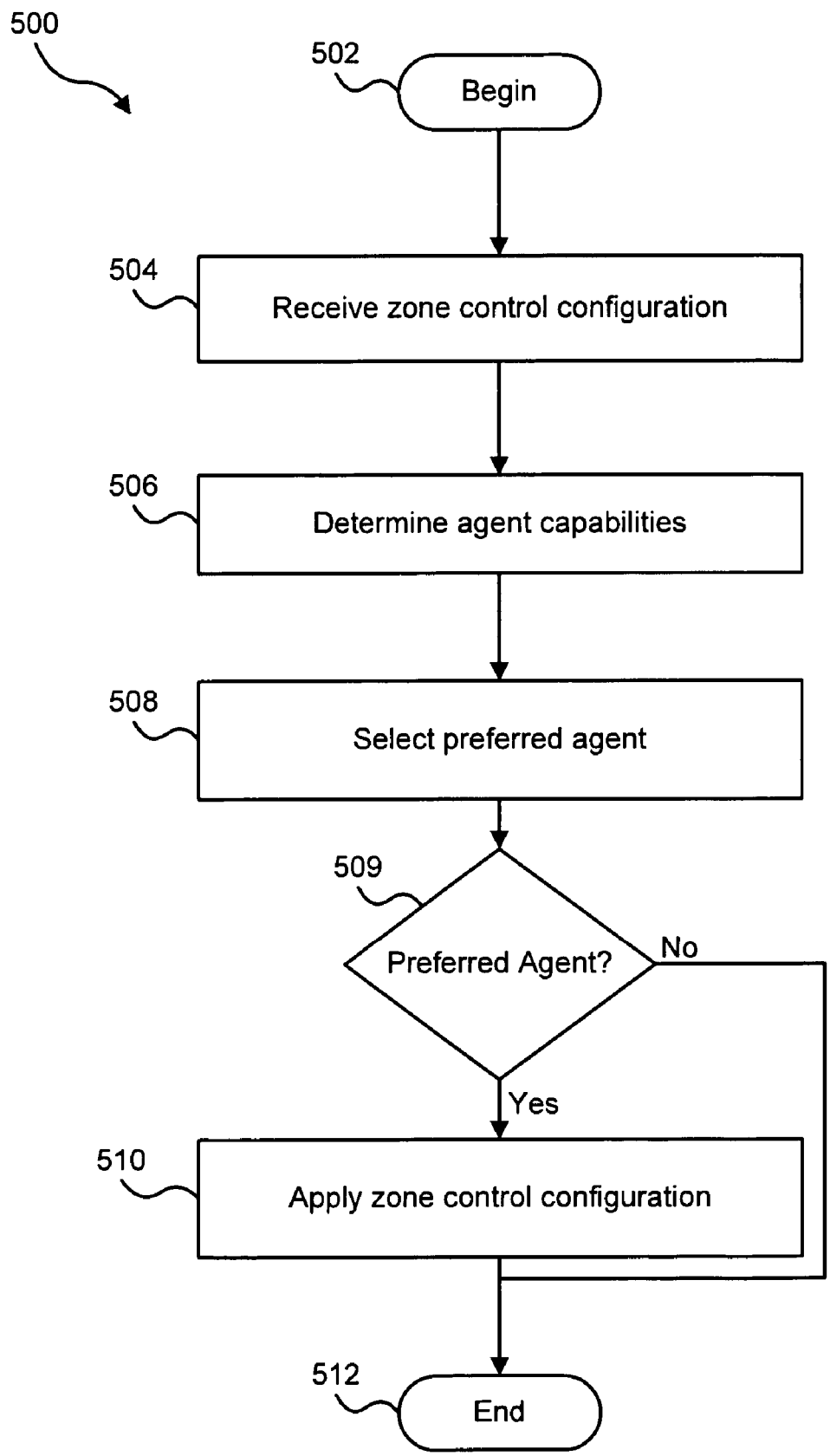
FIG. 5 is a schematic flow chart diagram illustrating one embodiment of a method for configuring a network feature for a network fabric.

FIG. 5 illustrates a method 500 for configuring zone control for a SAN fabric 106. The method 500 in the depicted embodiment begins 502 when the input module 302 receives 504 a zone control configuration 118 from a client 204. A network administrator uses the client 204 to specify a desired zone control configuration 118. The client 204 enables the network administrator to create, modify, and delete zones and to assign each host 102 and storage device 104 to one or more zones 120,122. Alternatively, a system other than the client 204 may provide the desired zone control configuration 118 to the feature configuration manager 202 using an API or other electronic communication.

Next, the discovery module 304 determines 506 the zone control capabilities 210 of each agent 114 coupled to the SAN fabric 106. In one embodiment, the discovery module 304 queries the capabilities module 402 of each agent 114 to determine the capabilities 210 of the management interface 116,216 coupled to the agent 114. Capabilities 210 of the management interface may include the protocol used by the management interface, the version of the protocol, whether the management interface 116,216 is enabled, whether the management interface 116,216 is an in-band interface 216 or an out-of-band interface 116, and the like. Other embodiments of the discovery module 304 may determine further capabilities 210 of the management interface 116,216.

Next, the selection module 306 selects 508 a preferred agent 212 from the plurality of agents 114. Typically, zone control capabilities 210 make some agents 114 more desirable than other agents 114. The selection module 306 assesses the desirability of an agent 114 using a method illustrated in FIG. 6.

Figure 6:
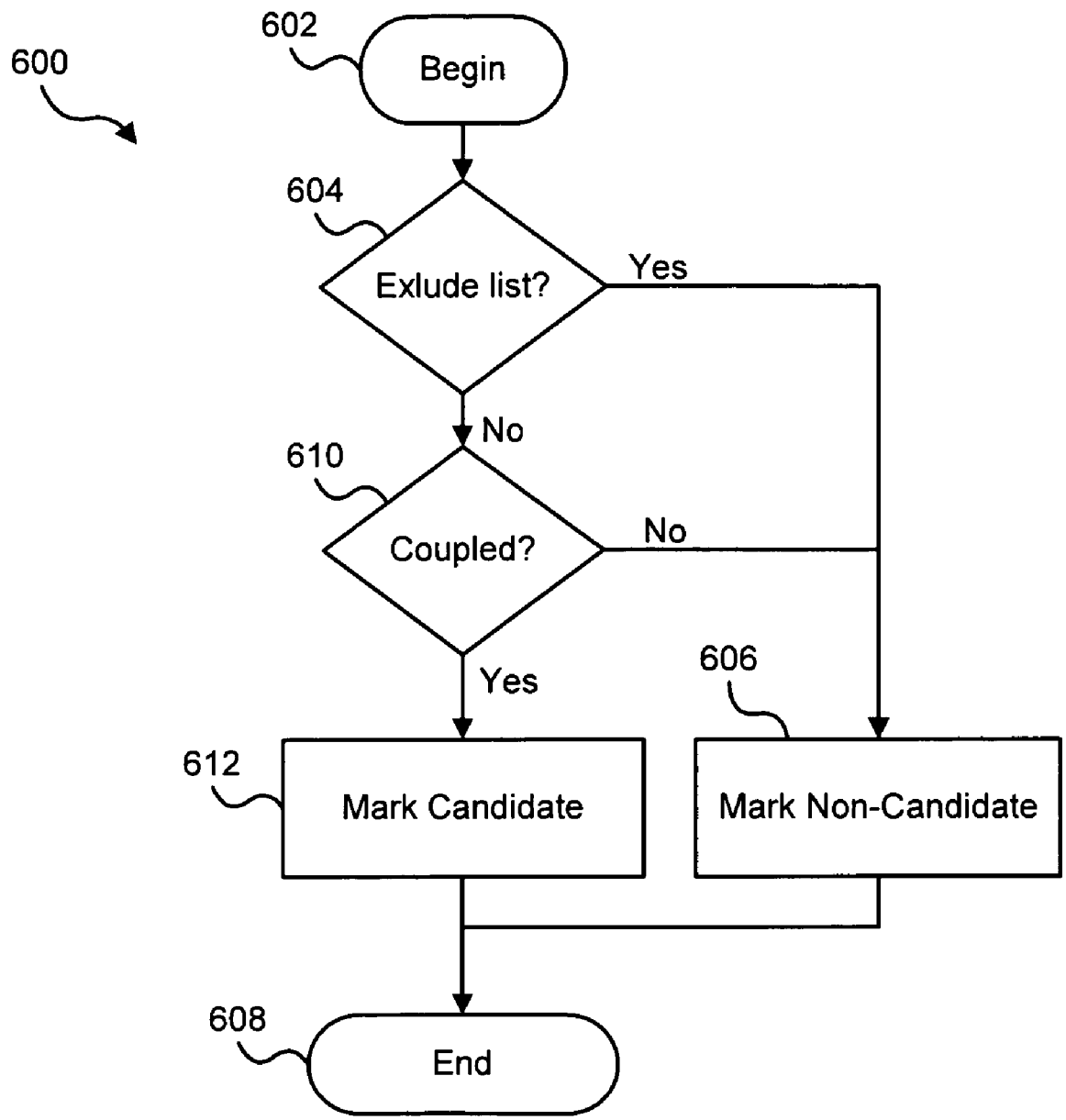
FIG. 6 is a schematic flow chart diagram illustrating one embodiment of a method for selecting preferred agent candidates.

FIG. 6 illustrates one embodiment of a method 600 the selection module 306 may use to identify one or more preferred agent candidates. The method begins 602 by determining 604 if a first identified agent 114 is a member of an excluded agent set. The selection module 306 may maintain the excluded agent set. The excluded agent set specifies agents 114 that a network administrator determines should not be used to configure the SAN fabric 106. The network administrator may include agents 114 in the excluded agent set list for a variety of reasons. For example, if the host 102 on which an agent 114 resides is scheduled for maintenance the network administrator may include the agent 114 in the excluded agent set. If the first agent 114 is in the excluded agent set the selection module 306 marks 606 the first agent 114 a non-candidate and the method ends 608.

If the first agent 114 is not in the excluded agent set, the selection module 306 searches the network feature capabilities 210 information gathered by the discovery module 304 to determine 610 if the first agent 114 is currently coupled to the SAN fabric 106. If the first agent 114 is not coupled to the SAN fabric 106 the selection module 306 marks 606 the first agent 114 a non-candidate and the method ends 608. If the first agent 114 is coupled to the SAN fabric 106, the selection module 306 marks 612 the first agent 114 a candidate and the method ends 608.

The method 600 is repeated for each of the agents 114 coupled to the SAN fabric 106. As a result, there may be one or more agents 114 the selection module 306 marks as preferred agent candidates. Referring now back to FIG. 5, if the selection module 306 determines 509 that all agents 114 are non-candidates the method 500 ends 512 since no preferred agent 212 may be selected.

Figure 7:
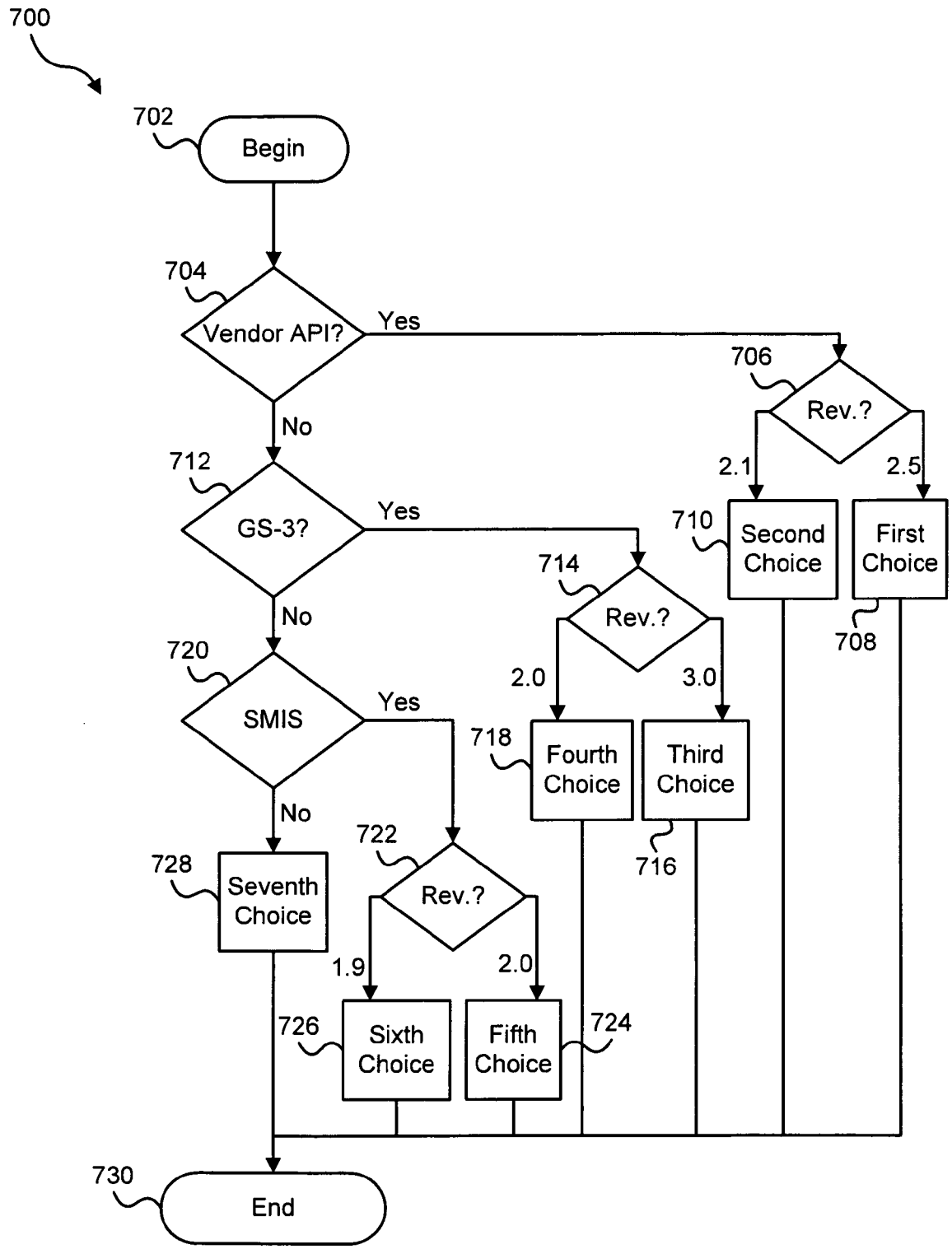
FIG. 7 is a schematic flow chart diagram illustrating one embodiment of a method for selecting a preferred agent from a set of preferred agent candidates.

If the selection module 306 marks one or more agents 114 as candidates, the selection module 306 follows the method 700 illustrated in FIG. 7 to select a preferred agent 212 from the list of candidate agents. The criteria the selection module 306 uses in method 600 to determine candidate agents 114 (The exclude list and connectivity to the SAN fabric 106) represents one embodiment of a method 600 to build a preferred candidate list. In other embodiments, the selection module 306 may use different or additional criteria well known to those of skill in the art to build a preferred candidate list.

FIG. 7 illustrates a method 700 that the selection module 306 may use to select a preferred agent 212 from the agents 114 marked as candidates. The method begins 702 when the selection module 306 searches the network features capabilities 210 information gathered by the discovery module 304 to determine 704 if the first candidate agent 114 uses a vendor API as a management interface 116,216. If the first candidate agent 114 uses a vendor API, the selection module 306 searches the network feature capabilities 210 information to determine 706 which version of vendor API the first candidate agent 114 uses.

If the first candidate agent 114 uses a later version, such as, for example, 2.5, the selection module 306 marks 708 the first candidate agent 114 as a first choice and the method ends 730. If the first candidate agent 114 uses an earlier version, such as, for example, 2.1, the selection module 306 marks 710 the first candidate agent 114 as a second choice and the method ends 730.

If the first candidate agent 114 does not use a vendor API as a management interface 116,216, the selection module 306 searches the network feature capabilities 210 information to determine 712 if the first agent 114, in one embodiment uses GS-3 as a management interface 116,216. GS-3 is a standards-based Fibre Channel protocol used to configure SAN fabrics 106. GS-3 is commonly used and well understood, but lacks session control and therefore is less desirable than a vendor API. If the first candidate agent 114 uses GS-3, the selection module 306 searches the network feature capabilities 210 information gathered to determine 714 which version of GS-3 the first candidate agent 114 uses.

If the first candidate agent 114 uses a later version, such as, for example, 3.0, the selection module 306 marks 716 the first candidate agent 114 as a third choice and the method ends 730. If the first candidate agent 114 uses a later version, such as, for example, version 2.0, the selection module 306 marks 718 the first candidate agent 114 as a fourth choice and the method ends 730.

If the first candidate agent 114 does not use GS-3 as a management interface 116,216, the selection module 306 searches the network feature capabilities 210 information gathered by the discovery module 304 to determine 720 if the first agent 114 uses SMIS as a management interface 116,216. SMIS is a standards-based protocol used to configure SAN fabrics 106. SMIS is a relatively new protocol and is not widely implemented; therefore, SMIS is typically less desirable than a vendor API or GS-3. If the first candidate agent 114 uses SMIS, the selection module 306 searches the capabilities information gathered by the discovery module 304 to determine 722 which version of SMIS the first candidate agent 114 uses.

If the first candidate agent 114 uses a later version, such as, for example, 2.0, the selection module 306 marks 724 the first candidate agent 114 as a fifth choice and the method ends 730. If the first candidate agent 114 uses an earlier version, such as, for example, 1.9, the selection module 306 marks 726 the first candidate agent 114 as a sixth choice and the method ends 730.

If the first candidate agent 114 does not use SMIS as a management interface 116,216 the selection module 306 marks 728 the first candidate agent 114 as a seventh choice and the method ends 730. The method 700 is preferably repeated for all candidate agents 114 so that the selection module 306 marks all candidate agents 114. Alternatively, as soon an agent 114 is marked as a first choice, the agent 114 is selected as the preferred agent 212. The selection module 306 then selects a preferred agent 212 by determining the highest ranked candidate agent 114. For example, if the selection module 306 marked a candidate agent 114 a first choice, the candidate agent 114 is the highest ranked candidate agent 114.

Certain criteria, such as protocols used, may be more desirable than other criteria. Factors affecting protocols may include: the format of the protocol (in-band or out-of-band), robustness of commands, quality of error codes the switch 110 returns when applying a configuration to a switch 110, the ability to create aliases names for devices 104 and hosts 102, and other capabilities. The placement of protocols in the method 700 typically represents each protocol's relative desirability.

The protocols and versions used in the method 700 represent one embodiment of the invention. Other embodiments may use different protocols or different protocol versions as criteria in selecting a preferred agent 212. Furthermore, those of skill in the art will recognize various other criteria that may be included in the method 700.

If the selection module 306 marks more than one candidate agent 114 as a first choice the selection module 306 may randomly select one of the candidate agents 114 marked as a first choice. If the selection module 306 has not marked any candidate agents 114 as a first choice, the candidate agents 114 marked as second choice are examined. This process preferably continues until the selection module 306 selects the highest ranked candidate agent 114.

Returning now to FIG. 5, the customization module 408 applies 510 the zone control configuration 118 to the SAN fabric 106 by sending commands to a switch 110 via the management interface 116,216 that couples the preferred agent 212 to the switch 110. Specifically, the assignment module 308 assigns the task module 404 of the preferred agent 212 to configure the SAN fabric 106. The task module 404 passes the configuration request to the customization module 408.

The switch 110 preferably forwards the network feature configuration 118 to the other switches 110 in the network fabric 106 using standard methods. The method 500 ends 512. The method 500 described above is an embodiment for configuring zone control for a SAN fabric 106. Another embodiment of the method may be used to configure substantially any network feature for substantially any network fabric 106.

Figure 8:
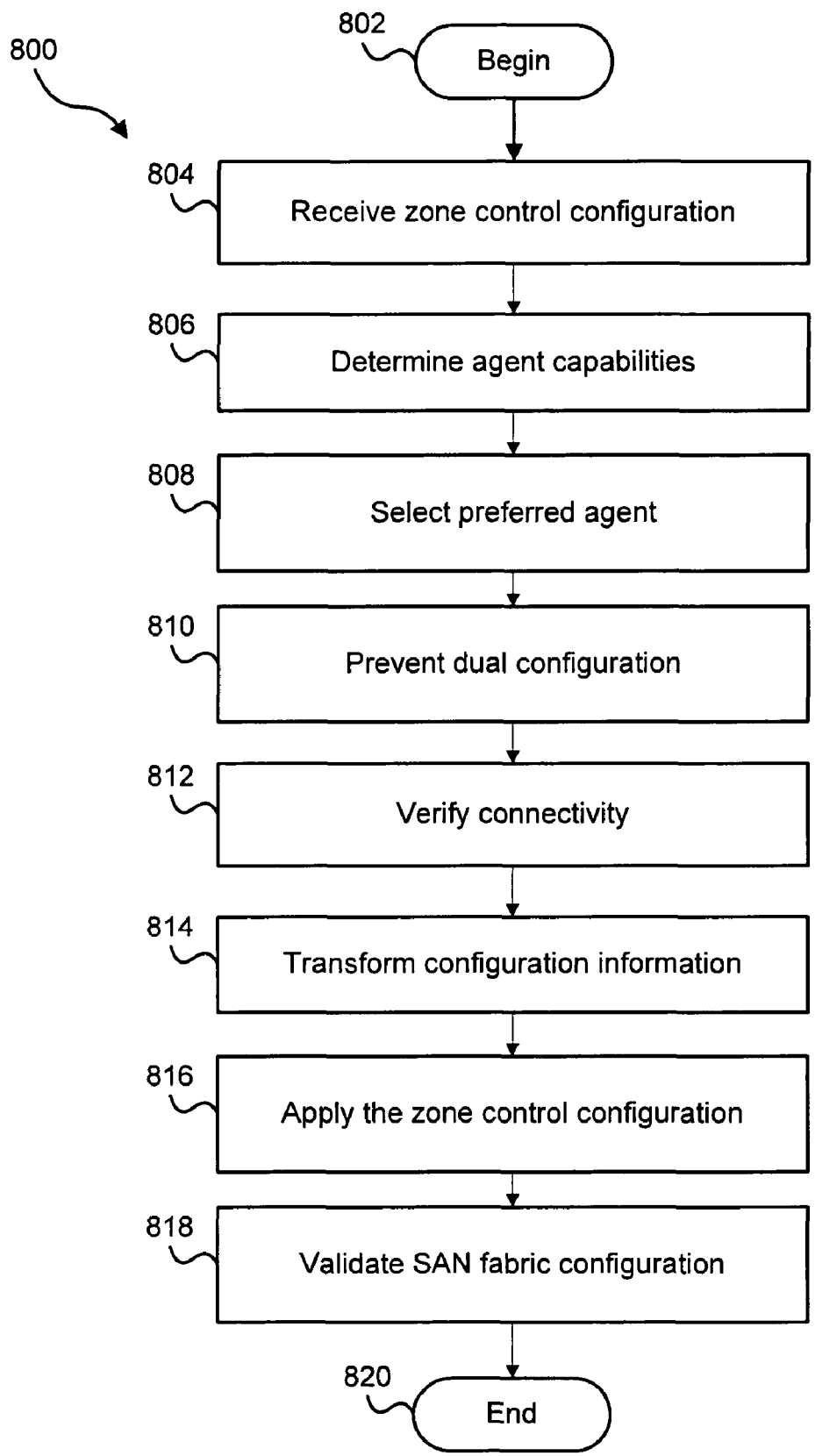
FIG. 8 is a schematic flow chart diagram illustrating one embodiment of a method for configuring a network feature for a network fabric.

FIG. 8 illustrates another embodiment of a method 800 for configuring zone control for a SAN fabric 106. The method 800 in the depicted embodiment begins 802 when the input module 302 receives 804 a zone control configuration 118, determines 806 each agents 114 capabilities, and selects 808 a preferred agent 212. These steps 804,806,808 are substantially the same as those described above in relation to method 500.

Next, an optional lock module 310 may prevent 810 dual configuration attempts for the SAN fabric 106. After a client 204 requests that the feature configuration manager 202 apply a first zone control configuration 118 to the SAN fabric 106, the lock module 310 locks out all other clients 204. Locking out the other clients 204 prevents the other clients 204 from requesting an additional zone control configuration 118 until the preferred agent 212 has applied the first zone control configuration 118.

Next, the verification module 412 verifies 812 that the preferred agent 212 is still coupled to a switch 110 by an in-band management interface 216, or out-of-band management interface 116. The verification module 412 may send the switch 110 a ping message or an equivalent command. If the switch 110 responds the verification module 412 determines that connectivity is present.

The verification module 412 may request an identifier from the switch 110, such as a Fibre Channel World Wide Name, before the customization module 408 sends each command to the switch 110 so that the verification module 412 may ensure that all configuration commands sent by the customization module 408 are sent to the same switch 110. Testing for connectivity and verifying an identifier is desirable since a network administrator may be unaware of changes in the SAN fabric 106. For example, a cable may be disconnected, or the topology of the SAN fabric 106 may be modified.

The translation module 406 transforms 814 the zone control configuration 118 into a format suitable for the management interface 116,216 that couples the preferred agent 212 to the SAN fabric 106. For example, a desired zone control configuration 118 command may be "add host fifteen to zone seven". However, the management interface 116,216 coupled to the preferred agent 212 may not understand the command syntax "add host fifteen to zone seven". Accordingly, the translation module 406 transforms 814 the command to a format that the management interface 116,216 understands.

For example, the translation module 406 may convert the command "add host fifteen to zone seven" to a new command "addzone 15, 7". Since the translation module 406 may be required to translate a command into a number of different formats, each format corresponding to a different management interface 116,216, the translation module 406 understands the syntax of each of the different management interfaces 116,216.

Next, the customization module 408 applies 816 the zone control configuration 118 to the switch 110 as described above. The confirmation module 410 validates 818 the SAN fabric configuration 118 after the customization module 408 applies the zone control configuration 118 to the switch 110. Confirmation is necessary since not all management interfaces 116,216 use protocols that emloy session control. Session control ensures that the command message is reliable received by the switch 110. Depending on the management interface 116,216 associated with the preferred agent 212, the confirmation module 410 may validate differently as needed.

For a first management interface 116,216 the confirmation module 410 may monitor the management interface 116,216 for error messages after each command that the customization module 408 sends to the switch 110. If an error message indicates that the switch 1100 did not accept the command sent by the customization module 408 the confirmation module 410 notifies the customization module 408 so that the command may be re-sent.

For a second management interface 116,216 after each command that the customization module 408 sends to the switch 110 via the management interface 116,216 the confirmation module 410 queries the switch 110 to validate that the switch 110 accepted the command that the customization module 408 sent. If the switch 110 did not accept the command, the confirmation module 410 notifies the customization module 408 so that the command may be re-sent.

In other embodiments the customization module 408 may use additional methods to validate that the switch 110 accepted the command that the customization module 408 sent. The switch 110 forwards the network feature configuration 118 to the other switches 110 in the network fabric 106 using standard methods outside the scope of this embodiment of the invention and the method 800 ends 820. The method 800 described above is an embodiment for configuring zone control for a SAN fabric 106. Other embodiments of the method may be used to configure substantially any network feature for substantially any network fabric 106.

The embodiments of the present invention may be embodied in other specific forms without departing from its spirit or essential characteristics. The described embodiments are to be considered in all respects only as illustrative and not restrictive. The scope of different embodiments of the invention is, therefore, indicated by the appended claims rather than by the foregoing description. All changes which come within the meaning and range of equivalency of the claims are to be embraced within their scope.

What is claimed is:

1. An apparatus for configuring a network feature for a network fabric, the apparatus comprising:
   a SAN fabric comprising a plurality of switches coupled to each other;
   a plurality of host data processors coupled to the SAN fabric;
   a plurality of storage devices coupled to the SAN fabric;
   a plurality of agents coupled to the SAN fabric;
   a feature configuration manager comprising
   an input module configured to receive a network feature configuration for a network fabric, wherein the network fabric is a heterogeneous storage area network ("SAN") comprising a set of devices from two or more different vendors;
   a discovery module configured to determine the zone control network feature capabilities of each of a plurality of agents coupled to the network fabric, the zone control network feature capabilities specifying the relative ability of each agent to perform zone control on the set of devices from the two or more different vendors;
   a selection module configured to select a preferred agent from the plurality of agents based on the determined zone control network feature capabilities of the plurality of agents;
   an assignment module configured to assign the preferred agent to apply the network feature configuration to the network fabric through a management interface coupling the preferred agent to the network fabric; and
   a lock module configured to prevent an agent from applying another network feature configuration to the network fabric as the preferred agent applies the network feature configuration to the network fabric;
   wherein at least one of the input module, discovery module, selection module, assignment module, and lock module is implemented in a tangible memory, and wherein the preferred agent comprises a capabilities module configured to provide zone control capability information to the feature configuration manager;
   a task module configured to receive a zone control configuration from the feature configuration manager; and
   a customization module configured to apply the zone control configuration to the SAN fabric through a management interface coupling the preferred agent to the SAN fabric.

2. The apparatus of claim 1, wherein the agent resides on a host data processor coupled to the network fabric.

3. The apparatus of claim 1 wherein the agent resides on a stand-alone server coupled to the network fabric by an out-of-band management interface.

4. An apparatus for configuring zone control for a Storage Area Network (SAN) fabric, the apparatus comprising:
   a SAN fabric comprising a plurality of switches coupled to each other;
   a plurality of host data processors coupled to the SAN fabric;
   a plurality of storage devices coupled to the SAN fabric;
   a plurality of agents coupled to the SAN fabric;
   a feature configuration manager comprising
   an input module configured to receive a network feature configuration for a network fabric, wherein the network fabric is a heterogeneous storage area network ("SAN") comprising a set of devices from two or more different vendors;
   a discovery module configured to determine the zone control network feature capabilities of each of a plurality of agents coupled to the network fabric, the zone control network feature capabilities specifying the relative ability of each agent to perform zone control on the set of devices from the two or more different vendors;
   a selection module configured to select a preferred agent from the plurality of agents based on the determined zone control network feature capabilities of the plurality of agents;
   an assignment module configured to assign the preferred agent to apply the network feature configuration to the network fabric through a management interface coupling the preferred agent to the network fabric;
a translation module configured to transform the zone control configuration into a format suitable for the management interface; and
a lock module configured to prevent an agent from applying another network feature configuration to the network fabric as the preferred agent applies the network feature configuration to the network fabric;
wherein at least one of the input module, discovery module, selection module, assignment module, lock module, and translation module is implemented in a tangible memory;
the preferred agent comprising:
a capabilities module configured to provide zone control capability information to a feature configuration manager;
a task module configured to receive a zone control configuration from the feature configuration manager; and
a customization module configured to apply the zone control configuration to a SAN fabric through a management interface coupling the apparatus to the SAN fabric.

5. The apparatus of claim 4, further comprising a confirmation module configured to validate the SAN fabric configuration after the apparatus applies the zone control configuration to the SAN fabric.

6. The apparatus of claim 4, further comprising a verification module configured to regularly verify that the apparatus is operably coupled to the SAN fabric.

7. The apparatus of claim 4, wherein the apparatus resides on a host data processor coupled to the SAN fabric.

8. The apparatus of claim 4, wherein the apparatus resides on a stand-alone server coupled to the SAN fabric by an out-of-band management interface.

9. A system to provide zone control configuration for a Storage Area Network (SAN) fabric, the system comprising:
a SAN fabric comprising a plurality of switches coupled to each other;
a plurality of host data processors coupled to the SAN fabric;
a plurality of storage devices coupled to the SAN fabric;
a plurality of agents coupled to the SAN fabric;
a feature configuration manager comprising;
an input module configured to receive a zone control configuration for a SAN fabric, wherein the network fabric is a heterogeneous storage area network ("SAN") comprising a set of devices from two or more different vendors;
a discovery module configured to determine the zone control network feature capabilities of each of a plurality of agents coupled to the network fabric, the zone control network feature capabilities specifying the relative ability of each agent to perform zone control on the set of devices from the two or more different vendors;
a selection module configured to select a preferred agent from the plurality of agents based on the determined zone control network feature capabilities of the plurality of agents;
an assignment module configured to assign the preferred agent to configure the SAN fabric according to the zone control configuration; and
a lock module configured to prevent an agent from applying another network feature configuration to the network fabric as the preferred agent applies the network feature configuration to the network fabric;
a preferred agent comprising;
a capabilities module configured to provide zone control capability information to the feature configuration manager;
a task module configured to receive a zone control configuration from the feature configuration manager; and
a customization module configured to apply the zone control configuration to the SAN fabric through a management interface coupling the preferred agent to the SAN fabric.

10. The system of claim 9, wherein the preferred agent further comprises a translation module configured to transforming the desired zone control configuration into a format suitable for the management interface.

11. The system of claim 9, wherein the preferred agent further comprises a confirmation module configured to validate the SAN fabric configuration after the preferred agent applies the configuration to the SAN fabric.

12. The system of claim 9, wherein the preferred agent further comprises a verification module configured to regularly verify that the preferred agent is operably coupled to the SAN fabric.

13. The system of claim 9, wherein at least one of the agents resides on a host data processor coupled to the SAN fabric.

14. The system of claim 9, wherein at least one of the agents resides on a stand-alone server coupled to the SAN fabric by an out-of-band management interface.

15. A method for configuring zone control for a Storage Area Network (SAN) fabric, the method comprising:
receiving a zone control configuration for a SAN fabric, wherein the network fabric is a heterogeneous storage area network ("SAN") comprising a set of devices from two or more different vendors;
determining the zone control capabilities of each of a plurality of agents associated with the SAN fabric, the zone control capabilities specifying the relative ability of each agent to perform zone control on the set of devices from the two or more different vendors;
selecting a preferred agent from the plurality of agents based on the determined zone control capabilities of the plurality of agents; and
applying the zone control configuration to the SAN fabric through a management interface coupling the preferred agent to the SAN fabric, wherein the preferred agent comprises
a capabilities module configured to provide zone control capability information to the feature configuration manager;
a task module configured to receive a zone control configuration from the feature configuration manager; and
a customization module configured to apply the zone control configuration to the SAN fabric through a management interface coupling the preferred agent to the SAN fabric.

16. The method of claim 15, further comprising preventing an agent from applying another zone control configuration to the SAN fabric as the preferred agent applies the zone control configuration to the SAN fabric.

17. The method of claim 15, further comprising transforming the desired zone control configuration into a format suitable for the management interface.

18. The method of claim 15, further comprising validating the SAN fabric configuration after the preferred agent applies the configuration to the SAN fabric.

19. The method of claim 15, further comprising regularly verifying that the preferred agent is operably coupled to the SAN fabric.

20. The method of claim 15, wherein the agent resides on a host system coupled to the SAN fabric.

21. The method of claim 15, wherein the agent resides on a stand-alone server coupled to the SAN fabric by an out-of-band management interface.

22. A non-transitory storage medium tangibly embodying a program of machine-readable instructions executable by a digital processing apparatus to perform operations to configure zone control for a Storage Area Network (SAN) fabric, the operations comprising:

an operation to receive a zone control configuration for a SAN fabric, wherein the network fabric is a heterogeneous storage area network ("SAN") comprising a set of devices from two or more different vendors;

an operation to determine the zone control network feature capabilities of each of a plurality of agents coupled to the network fabric, the zone control network feature capabilities specifying the relative ability of each agent to perform zone control on the set of devices from the two or more different vendors;

an operation to select a preferred agent from the plurality of agents based on the determined zone control network feature capabilities of the plurality of agents;

an operation to apply the zone control configuration to the SAN fabric through a management interface coupling the preferred agent to the SAN fabric, wherein the preferred agent comprises a capabilities module configured to provide zone control capability information to the feature configuration manager;

a task module configured to receive a zone control configuration from the feature configuration manager; and a customization module configured to apply the zone control configuration to the SAN fabric through a management interface coupling the preferred agent to the SAN fabric.

23. The non-transitory storage medium of claim 22, further comprising an operation to transform the desired zone control configuration into a format suitable for the management interface.

24. The non-transitory storage medium of claim 22, further comprising an operation to validate the SAN fabric configuration after the preferred agent applies the configuration to the SAN fabric.

25. An apparatus for configuring zone control for a Storage Area Network (SAN) fabric, the apparatus comprising:

a means for receiving a zone control configuration for a SAN fabric, wherein the SAN fabric is a heterogeneous network comprising a set of devices from two or more different vendors;

a means for determining the zone control capabilities of each of a plurality of agents associated with the SAN fabric, the zone control capabilities specifying the relative ability of each agent to perform zone control on the set of devices from the two or more different vendors;

a means for selecting a preferred agent from the plurality of agents based on the determined zone control capabilities of the plurality of agents;

a means for applying the zone control configuration to the SAN fabric through a management interface coupling the preferred agent to the SAN fabric; and a means for preventing an agent from applying another network feature configuration to the network fabric as the preferred agent applies the network feature configuration to the network fabric;

wherein at least one of the means for receiving, means for determining, means for selecting, means for applying, and means for preventing is implemented in a tangible memory, wherein the preferred agent comprises a capabilities module configured to provide zone control capability information to the feature configuration manager;

a task module configured to receive a zone control configuration from the feature configuration manager; and a customization module configured to apply the zone control configuration to the SAN fabric through a management interface coupling the preferred agent to the SAN fabric.

26. The apparatus of claim 25, further comprising a means for transforming the desired zone control configuration into a format suitable for the management interface.

27. The apparatus of claim 25, further comprising a means for validating the SAN fabric configuration after the preferred agent applies the configuration to the SAN fabric.

* * * * *